US006489597B1

(12) United States Patent
Hornung

(10) Patent No.: US 6,489,597 B1
(45) Date of Patent: Dec. 3, 2002

(54) RANGE SURFACE HEATING UNIT RELAY POWER SWITCHING CONTROL

(75) Inventor: Richard Edward Hornung, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/480,346

(22) Filed: Jan. 10, 2000

(51) Int. Cl.[7] .................................................. H04B 1/02

(52) U.S. Cl. ....................... 219/519; 219/448; 219/483; 219/451

(58) Field of Search ................................ 219/445, 448, 219/451, 452, 483, 486, 519, 508, 509

(56) References Cited

U.S. PATENT DOCUMENTS

| | | | | | |
|---|---|---|---|---|---|
| 2,664,489 | A | | 12/1953 | Dickey | |
| 2,993,975 | A | | 7/1961 | Beal | |
| 3,122,626 | A | | 2/1964 | Welch | |
| 3,549,862 | A | | 12/1970 | Holtkamp et al. | |
| 4,217,482 | A | * | 8/1980 | Wadia | 219/494 |
| 4,413,174 | A | * | 11/1983 | Ting | 219/508 |
| 4,443,690 | A | | 4/1984 | Payne et al. | |
| 4,465,924 | A | | 8/1984 | Payne | |
| 4,634,842 | A | | 1/1987 | Payne | |
| 5,008,516 | A | | 4/1991 | Holling | |
| 5,235,159 | A | * | 8/1993 | Kornrumpf et al. | 219/486 |
| 5,308,957 | A | * | 5/1994 | Huffington | 219/483 |
| 5,585,025 | A | * | 12/1996 | Idland | 219/485 |

* cited by examiner

*Primary Examiner*—Mark Paschall
(74) *Attorney, Agent, or Firm*—Armstrong Teasdale LLP

(57) ABSTRACT

A range burner surface heater system includes an input selector, a control, a surface heating unit, and a pair of low cost relay switches. The input selector is connected to the control, and the switches are responsive to the control. The surface heating unit is located between the low cost relay switches, with each relay switch connected to a separate power line. The relay switches are alternately opened and closed to energize the surface heating unit singly and in combination. At lower power levels, the switches are operated at current levels of one half the rated current of each switch to extend the life of the switches.

22 Claims, 5 Drawing Sheets

RANGE SURFACE HEATING UNIT RELAY POWER SWITCHING CONTROL

BACKGROUND OF THE INVENTION

This invention relates generally to power switching and, more particularly, to power switching for an electric range surface heating unit.

Range surface heating units, commonly referred to as burners, typically include a microcomputer which controls energization of triacs. Specifically, the microcomputer controls the operation of triac gates, which results in energizing and de-energizing a surface heater. Over the expected life of the heating unit, the triacs may need to cycle over one million times. Triac systems capable of such cycling are expensive.

Infinite heat switches also can be used to control heat generated by a range surface burner. With such switches, the switch duty cycle is controlled to control the supply of a voltage to the burner. Controlling the switch duty cycle therefore results in controlling the energy, or heat, output of the burner. For example, at a low power setting, a duty cycle which results in voltage being supplied to the burner for 25% of the time is utilized. Such cycling results in uneven cooking in that for a selected period of time, the burner is ON, and for the remainder of the cycle, the burner is OFF. Approximately 80% of surface heater unit cooking is accomplished at intermediate duty cycles of 34% or less.

Accordingly, it would be desirable to provide a cost effective alternative to triacs for switching and controlling power to range surface heaters that produces even heating at intermediate power levels.

BRIEF SUMMARY OF THE INVENTION

In an exemplary embodiment of the invention, a surface heater unit comprises an input selector, a control, a first relay switch, a second relay switch, and a surface heater. The input selector is operatively connected to the control, and the control is responsive to the input selector. The surface heater is operatively connected between the relay switches, and the switches are operatively connected to the control. The first and second switches are connected to a first power line and a second power line, respectively, and are alternately opened and closed to energize and de-energize the heater with power from one or both of the first and second power lines.

Thus, the first and second relay switches replace a single triac or infinite heat switch for controlling power to a surface heater. Consequently, the splitting of the making and breaking of current paths between two switches rather than one allows first and second relay switches to be used to increase system life. Further, because most cooking occurs at lower power levels, the first and second relay switches may be operated at current levels at about or below one-half of the rated current of the switches. Consequently, the expected life of the low cost first and second relay switches is greatly extended.

Also, the reduced power to the surface heaters that allows for the extended lives of the first and second relays switches requires a longer duty cycle to generate a given amount of heat than a comparable surface heater controlled with infinite heat switches or triacs. Thus, rather than the intense bursts of energy for a short period of time that triacs and infinite heat switches produce, the first and second relay switches supply a reduced energy level to the surface heater for a longer period of time. The temperature fluctuation of the surface heater is therefore decreased, and a steady heat is produced for a longer time period.

Thus, a long life range surface heater unit is provided that is less expensive than triacs, and that generates even surface unit heating at intermediate power levels.

DETAILED DESCRIPTION OF THE INVENTION

Figure 1:
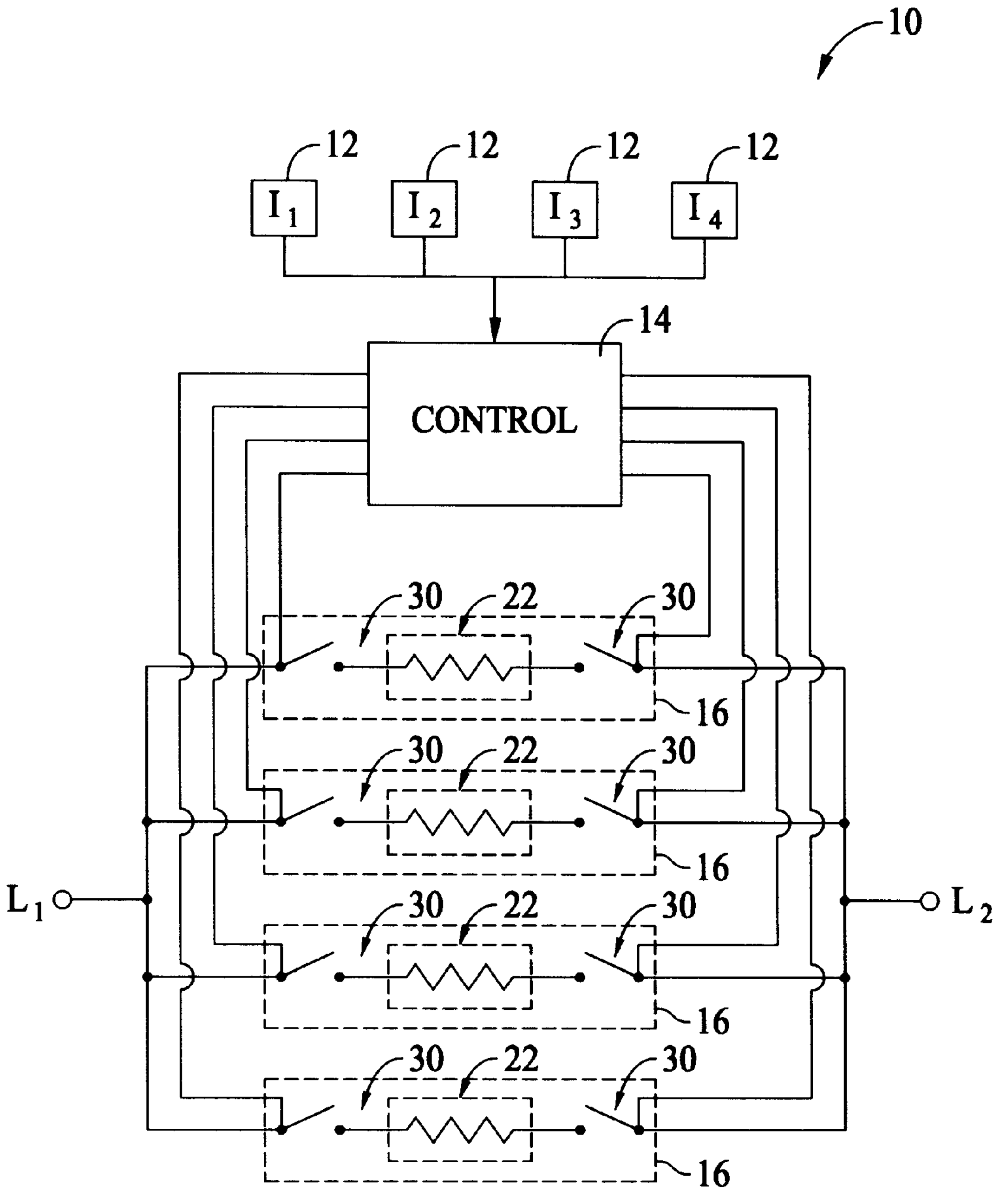
FIG. 1 is a schematic diagram of a range surface unit system.

FIG. 1 schematically illustrates a range surface heater unit system 10 including a plurality of input selectors 12, a control 14, and a plurality of surface heater subsystems 16 including a surface heating unit 22 and a pair of low cost relay switches 30.

Each input selector 12 is operatively connected to control 14 for selecting a power setting for one of surface heater units 22 by user manipulation of input selector 12. In one embodiment, input selectors 12 are knobs. Alternatively, input selectors 12 are touch control interfaces. In a further alternative embodiment, greater or fewer than four input selectors 12 are used to control greater or fewer than four surface heating units 22.

Control 14 is responsive to input selectors 12 and is operatively connected to relay switches 30. In one embodiment, control 14 includes a microprocessor (not shown). Alternatively, control 14 includes electrical and mechanical switching systems known in the art that are capable of performing the switching functions set forth below.

Surface heating units 22 are conventional metal burners, ceramic heating elements, bridge elements, warmers, or other electrical heating elements known in the art and are electrically connected between relay switches 30. Relay switches 30 complete circuits through surface heating units in response to control 14. Power is supplied to heating units 22 through first power line $L_1$ and second power $L_2$ of a conventional 220 or 240 volt 60 Hz power source. As illustrated in FIG. 1, each surface heating unit 22 is in a neutral state, i.e., not energized.

Figure 2:
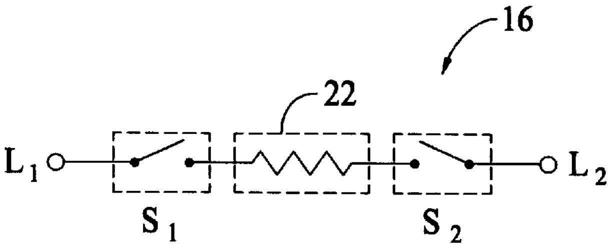
FIG. 2 is a portion of the system shown in FIG. 1 according to a first embodiment.

FIG. 2 illustrates subsystem 16 including a first switch $S_1$ connected to surface heater unit 22 and to first power line $L_1$. A second switch $S_2$ is connected to surface heater unit 22 and to second power line $L_2$. Both switches $S_1$ and $S_2$ are single throw, single pole switches that are opened and closed alternately to energize heating unit 22.

Figure 3:
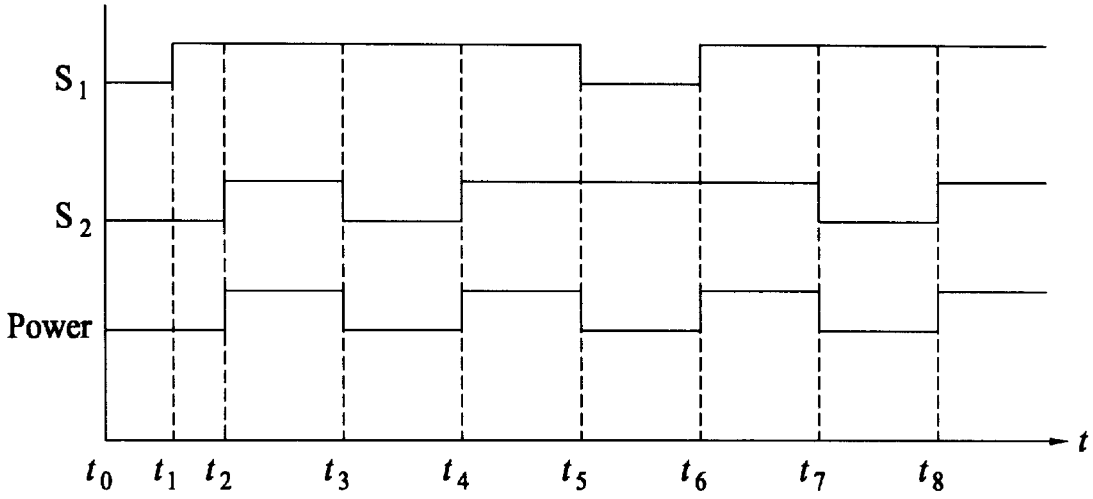
FIG. 3 is the power response of the system shown in FIG. 2.

FIG. 3 illustrates the operation of subsystem 16. At time $t_0$, both switches $S_1$, $S_2$ are open and no power is delivered to surface heater unit 22. At time $t_1$ an input selector 12 (shown in FIG. 1) is manipulated causing control 14 (shown in FIG. 1) to close switch $S_1$. A short time later at time $t_2$, control 14 closes switch $S_2$. Because both single throw switches $S_1$, $S_2$ are now closed, a circuit is completed through surface heating unit 22 (FIG. 2) and unit 22 begins to heat. At time $t_3$ switch $S_2$ is opened by control 14, the circuit is broken, and surface heater unit 22 is de-energized. Switch $S_1$, however, remains closed. At time $t_4$, switch $S_2$ is closed, and since switch $S_1$ is already closed, surface heater unit 22 is energized again.

At time $t_5$, control 14 opens switch $S_1$ and, since only one of the switches is now closed, surface heater unit 22 is de-energized. Switch $S_2$, however, remains closed at time $t_5$ so that when switch $S_1$ is closed at time $t_6$, both switches are closed and surface heater unit 22 is energized. At time $t_7$, switch $S_2$ is opened while switch $S_1$ remains closed, and the cycle continues. The relative time durations between opening and closing of switches $S_1$ and $S_2$ is determined by control 14 in response to input selector 12 that is manipulated to a desired power setting by a user.

Thus, switches $S_1$, $S_2$ are alternately opened and closed in an overlapping time cycle so that surface heater unit 22 is energized upon the closing of only one of the two switches $S_1$, $S_2$ rather than simultaneous closing of both switches. Consequently, switching operations of switches $S_1$, $S_2$ are reduced by approximately one half so that the operational cycle life of subsystem 16 is approximately twice that of the cycle life of switches $S_1$, $S_2$. Since single pole switches $S_1$ and $S_2$ have an approximate life of 200,000 cycles, subsystem 16 has an approximate life of 400,000 cycles. Alternate switching of switches $S_1$ and $S_2$ to control surface heater 22 unit may be achieved at reduced cost in comparison to triac systems.

Figure 4:
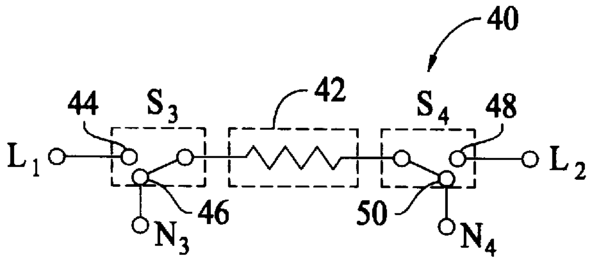
FIG. 4 is a portion of the system shown in FIG. 1 according to a second embodiment.

FIG. 4 illustrates an alternative surface heater subsystem 40 in accordance with a second embodiment of the invention. Subsystem 40 is interchangeable with subsystem 16 for use in range surface heater system 10 (shown in FIG. 1) and includes a first switch $S_3$ connected to surface heater unit 42 and to first power line $L_1$. A second switch $S_4$ is connected to surface heater unit 42 and to second power line $L_2$. Both switches $S_3$ and $S_4$ are double throw switches that control heating unit 42.

Switch $S_3$ connects surface heater unit 42 to first power line $L_1$ on a first throw 44 and to neutral $N_3$ on a second throw 46. Switch $S_4$ connects to second power line $L_2$ on a first throw 48 and connected to neutral $N_4$ on a second throw 50. Switches $S_3$, $S_4$ switch current that does not exceed a rated current for each switch. By connecting second throws 46, 50 to neutral $N_3$, $N_4$, respectively, surface heater unit 42 can be operated with one switch switched to first throw 44 or 48, i.e., to surface heater unit 42, and the other switch switched to second throw 46 or 50, i.e., to neutral $N_3$, $N_4$, respectively.

Range surface heater unit system 40 operates switches $S_3$, $S_4$ predominately at current levels below the rated current of each switch to extend switch life to the level of usage expectations for system 40. Consequently, the lower current levels require a longer duty cycle to produce a given amount of heat in comparison to triac systems or infinite heat switches. A longer duty cycle, however, enhances performance of system 10 in terms of more even heating of surface heater unit 42. Thus, better performance is achieved with lower cost relay switches $S_3$, $S_4$ relative to triac systems by operating switches $S_3$, $S_4$ to switch current at or below one half of each respective rated current.

Figure 5:
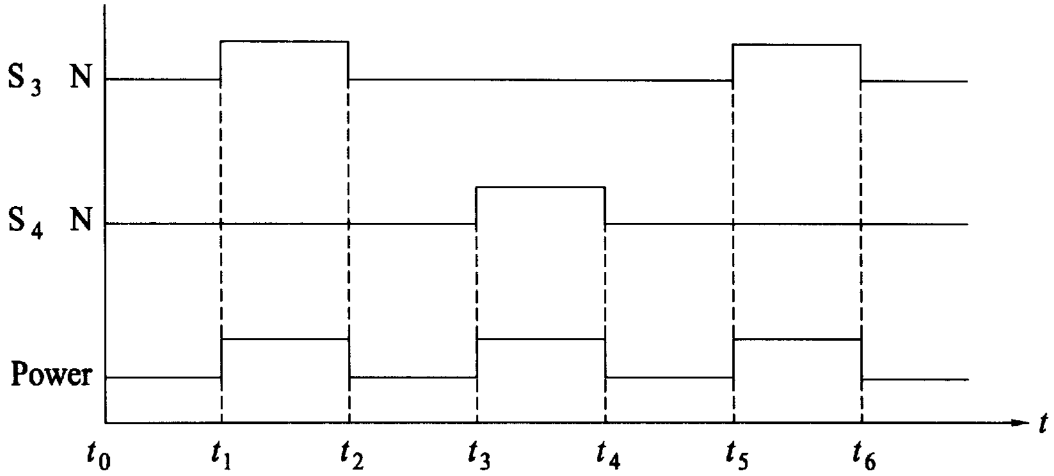
FIG. 5 is the power response of the system shown in FIG. 5 in a first mode of operation.

FIG. 5 illustrates the operation of subsystem 40 in a first mode of operation for lower power levels. At time $t_0$, both switches $S_3$, $S_4$ are switched to second throws 46, 50 and no power is delivered to surface heater unit 42. At time $t_1$ an input selector 12 (FIG. 1) is manipulated causing control 14 (FIG. 1) to operate switch $S_3$ to first throw 44 (FIG. 4). Because switch $S_4$ is connected to neutral on second throw 50 (FIG. 4), a circuit is completed, energy flows through surface heating unit 42 and unit 42 heats. At time $t_2$ switch $S_3$ is switched to second throw 46, the circuit is broken and heater unit 42 is de-energized. At time $t_3$, switch $S_4$ is switched to first throw 48 and surface heater 42 is again energized until time $t_4$ when switch $S_4$ is switched back to second throw 50, and the switching cycle continues. Thus, switches $S_3$, $S_4$ are switched alternately between first throw 44 or 48 and second throws 46 or 50 to energize surface heater unit 42 with only one of first power line $L_1$ and second power line $L_2$.

Alternate switching of double pole switches $S_3$ and $S_4$ works well for low power cooking. While switches $S_3$ and $S_4$ have expected switching lives of about 200,000 cycles, approximately 70% of cooking takes place at duty cycles of approximately 25% of maximum power or less. Thus an expected life of switches $S_3$ and $S_4$ is approximately 60,000 cycles (0.3×200,000) at higher power levels and 140,000 cycles (0.7×200,000) at lower power levels.

However, if the current actually switched is about one half the rated current of a relay, the life of the relay can be increased about four times, so an expected life of switches $S_3$ and $S_4$ can be extended to 560,000 cycles (140,000×4) at low power levels. Therefore, by strategically choosing switches $S_3$ and $S_4$ with a rated current about twice the current needed to operate the heater at 25% of full power, and by switching one of double pole switches $S_3$, $S_4$ to neutral $N_3$, $N_4$, respectively, as described above, each relay can be expected to have a life of about 620,000 cycles (60,000 plus 560,000). Operating the switches alternately as described above results in an expected life of about 1,240,000 (620,000×2) cycles for the system. Thus, a long life system is provided that avoids the expense of triac systems while providing a life span comparable to known alternative switching systems, such as infinite heat switches.

Figure 6:
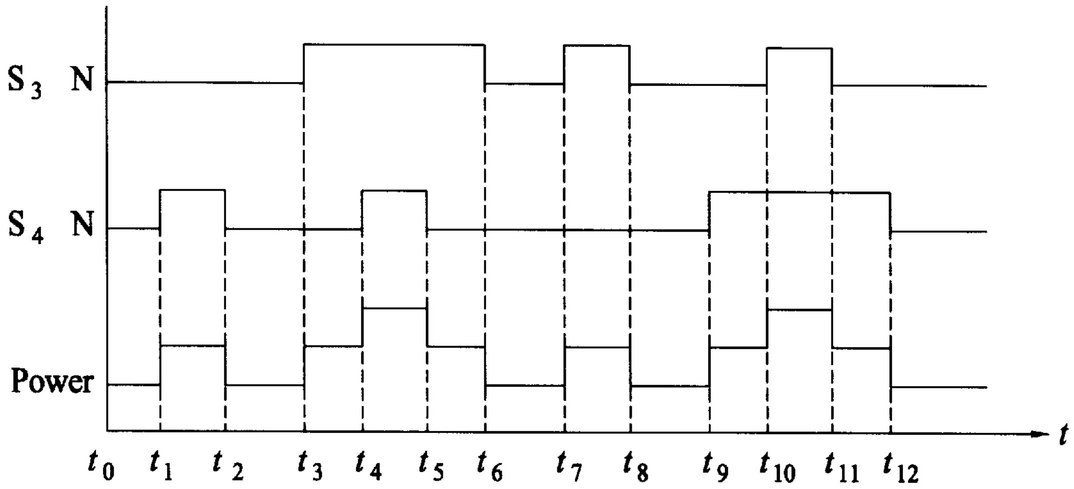
FIG. 6 is the power response of the system shown in FIG. 5 in a second mode of operation.

FIG. 6 illustrates the operation of subsystem 40 in a second mode of operation for higher power levels. At time $t_0$, both switches $S_3$ and $S_4$ are switched to neutral $N_3$, $N_4$, respectively, and surface heater unit 42 (FIG. 4) is de-energized. At time $t_1$, switch $S_4$ is switched to first throw 48 (FIG. 4), a circuit is completed, surface heater unit 42 is energized and heat is generated. At time $t_2$ switch $S_4$ is switched back to neutral and the circuit is broken.

At time $t_3$ switch $S_3$ is switched to first throw 44 (FIG. 4) and surface heater unit 42 is energized. A short time later at time $t_4$, switch $S_4$ is switched to first throw 48 and the voltage of both first power line $L_1$ and second power line $L_2$ is placed across surface heater unit 42. Thus, the power generated in surface heater unit 42 is the cumulative power of each line and switch alone, and surface heater unit 42 operates at a higher power.

At time $t_5$ switch $S_4$ is switched back to neutral, and surface heater unit 42 operates at lower power until time $t_6$ when switch $S_3$ is switched back to neutral and surface heater unit 42 is de-energized. The switching cycle repeats at times $t_7$ through $t_{12}$ with the relative order of the switching of switches $S_3$ and $S_4$ reversed.

Figure 7:
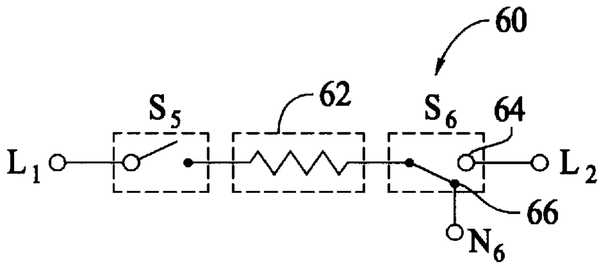
FIG. 7 is a portion of the system shown in FIG. 1 according to a third embodiment.

FIG. 7 illustrates another alternative surface heater subsystem 60 in accordance with a third embodiment of the invention. Subsystem 60 is interchangeable with subsystem 16 and subsystem 40 for use in range surface heater system 10 (shown in FIG. 1) and combines alternate switching and neutral switching modes as described above. A first switch $S_5$ is connected to surface heater unit 62 and to first power line $L_1$. A second switch $S_6$ is connected to surface heater unit 62 and to second power line $L_2$. Switch $S_5$ is a single throw relay switch and switch $S_6$ is a double throw relay switch. Switch $S_6$ is connected to second power line $L_2$ on a first throw 64 and connected to neutral $N_6$ on a second throw 66. Switches $S_5$ and $S_6$ switch current that does not exceed a rated current for each switch. By throwing switch $S_6$ to neutral $N_6$, surface heater unit 62 can be operated with single throw switch $S_5$.

Figure 8:
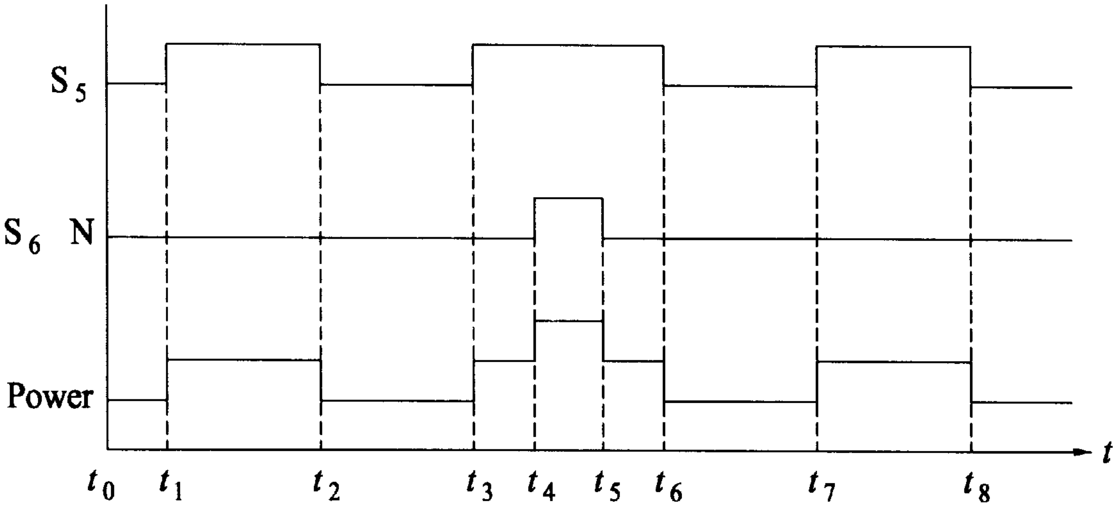
FIG. 8 shows the power response of the system shown in FIG. 7.

FIG. 8 illustrates the operation of subsystem 60. At time $t_0$ switch $S_5$ is opened and switch $S_6$ is thrown to neutral so no power is delivered to surface heater unit 62 (FIG. 7). At time $t_1$ an input selector 12 (FIG. 1) is manipulated causing control 14 (FIG. 1) to close switch $S_5$. Because switch $S_6$ is connected to neutral $N_6$ on second throw 66 (FIG. 7), a circuit is completed, energy flows through surface heating unit 62 (FIG. 7) and unit 62 heats. At time $t_2$ switch $S_5$ is opened, the circuit is broken and heater unit 62 is de-energized.

At time $t_3$, switch $S_5$ is again closed and surface heater unit 62 is again energized. At time $t_4$ switch $S_6$ is switched to first throw 64 and the voltage of both first power line $L_1$ and second power line $L_2$ is applied across surface heater unit 62 (FIG. 7). Thus, the power generated in surface heater unit 62 is the cumulative power generated by each line through each switch alone, and surface heater unit 62 operates at a higher power.

At time $t_5$ switch $S_6$ is switched back to neutral, and surface heater unit 62 operates at lower power until time $t_6$ when switch $S_5$ is opened and surface heater unit 62 is de-energized. The switching cycle repeats beginning at time $t_7$.

While the invention has been described in terms of various specific embodiments, those skilled in the art will recognize that the invention can be practiced with modification within the spirit and scope of the claims.

What is claimed is:

1. A surface heater unit system comprising:

at least one input selector;

a control operatively connected to said at least one input selector, said control responsive to said input selector;

a first relay switch operatively connected to said control and responsive to said control;

a second relay switch operatively connected to said control and responsive to said control; and a surface heater operatively connected between said first relay switch and said second relay switch, said second switch comprising a double throw switch, said second switch connected to neutral on a first throw.

2. A surface heater unit system in accordance with claim 1 wherein said first relay switch comprises a single pole switch.

3. A surface heater unit system in accordance with claim 2 wherein said single pole switch comprises a single throw switch.

4. A surface heater unit system in accordance with claim 3 wherein said surface heater is energized when said first relay switch is closed and said second switch is thrown to neutral, and said surface heater is de-energized when said first relay switch is open.

5. A surface heater unit system in accordance with claim 4 wherein said second relay switch is connected to a power line on a second throw, said surface heater is energized at a first power level when said first relay switch is closed and said second switch is thrown to neutral, said surface heater energized at a second power level when said first relay switch is closed and said second relay switch is thrown to said power line.

6. A surface heater unit system in accordance with claim 2 wherein said first relay switch comprises a double throw switch.

7. A surface heater unit system in accordance with claim 6 wherein said surface heater unit further comprises first and second power lines of opposite polarity and wherein said first relay switch is connected to said first power line on a first throw and connected to neutral on a second throw, said second relay switch connected to said second power line on a second throw.

8. A surface heater unit system in accordance with claim 7 wherein one of said first and second relay switches remains switched to neutral, and the other of said first and second relay switch is switched between said first throw and said second throw to energize and de-energize said surface heater.

9. A surface heater unit in accordance with claim 7 wherein said surface heater is energized at a first power level when said first switch is thrown to neutral and said second switch is thrown to said second power line, said surface heater energized at a second power level when said first switch is thrown to said first power line and said second switch is thrown to said second power line.

10. A surface heater unit system in accordance with claim 8 wherein said surface heater unit is configured to operate up to a maximum power setting, said first relay switch is switched to said first power line and said second relay switch is switched to said second power line when said surface heater unit is operated at more than about 25% of said maximum power setting.

11. A surface heater unit system in accordance with claim 7 wherein said surface heater is de-energized when said first and said second switches are switched to neutral.

12. A surface heater unit system in accordance with claim 1, further comprising first and second power lines of opposite polarity, said first relay switch connected between said first line and said heater, and said second relay switch connected between said second power line and said heater.

13. A surface heater unit system in accordance with claim 1 wherein said first relay switch is a single throw switch.

14. A surface heater unit system in accordance with claim 13 wherein said surface heater unit is configured to operate up to a maximum power setting, said first relay switch is closed and said second relay switch is switched to said second power line only when said surface heater unit is operated at more than about 25% of said maximum power setting.

15. A method for controlling a surface heater unit system, the surface heater unit including an input selector, a controller, a first relay switch, a second relay switch, and a surface heater, the surface heater operatively connected between the first relay switch and the second relay switch, said method comprising the steps of:

connecting the controller to the input selector and the relay switches; and alternately opening and closing the switches with the controller to energize and de-energize the heater in response to the input selector.

16. A method in accordance with claim 15 wherein the surface heater is connected to at least one power line, at least one of the first and second switches including double throw actuation, the at least one switch including a first throw connected to the power line and a second throw connected to neutral, said method further comprising the steps of:

switching the at least one switch to neutral; and switching the other of the first and second switches to complete a circuit through the burner and the at least one switch and energize the surface heater.

17. A method in accordance with claim 16 wherein the other of the first and second switches includes double throw actuation, the other of the first and second switches connected to the surface heater and including a first throw connected to the power line and a second throw connected to neutral, said method further comprising the steps of switching each switch to neutral to de-energize the surface heater.

18. A method in accordance with claim 17 wherein said method further comprises the step of cycling the first switch and the second switch between the first and second throws in response to the input selector.

19. A method in accordance with claim 18 further comprising the step of reversing the order of switching operations between the first relay switch and the second relay switch for each switching cycle.

20. A surface heater unit system comprising:

at least one input selector;

a control operatively connected to said at least one input selector, said control responsive to said input selector;

a first single throw relay switch operatively connected to said control and responsive to said control;

a second single throw relay switch operatively connected to said control and responsive to said control; and a surface heater operatively connected between said first relay switch and said second relay switch.

21. A surface heater unit system in accordance with claim 20 wherein said first single pole relay switch and said second single pole relay comprise single pole switches.

22. A surface heater unit system in accordance with claim 21 wherein said surface heater is energized when said first relay switch and said second relay switch are closed, and said surface heater is de-energized when one of said first relay switch and said second relay switch is open.

* * * * *